(No Model.)

G. ANDERSON.
AUTOMATIC WEIGHING APPARATUS.

No. 561,470. Patented June 2, 1896.

Witnesses
A. N. Dobson
G. P. Kramer

Inventor
Gilbert Anderson
By John Freeman
Attorney

UNITED STATES PATENT OFFICE.

GILBERT ANDERSON, OF CHRISTCHURCH, NEW ZEALAND.

AUTOMATIC WEIGHING APPARATUS.

SPECIFICATION forming part of Letters Patent No. 561,470, dated June 2, 1896.

Application filed September 8, 1894. Serial No. 522,478. (No model.) Patented in New Zealand September 8, 1892, No. 5,760; in Victoria October 6, 1892, No. 10,021; in Queensland October 7, 1892, No. 2,185, and in New South Wales October 8, 1892, No. 4,028.

*To all whom it may concern:*

Be it known that I, GILBERT ANDERSON, a subject of the Queen of Great Britain and Ireland, residing at Christchurch, in the Colony of New Zealand, have invented a certain new and useful Automatic Weighing Apparatus, (for which I have obtained Letters Patent in Victoria, No. 10,021, dated October 6, 1892; in New Zealand, No. 5,760, dated September 8, 1892; in Queensland, No. 2,185, dated October 7, 1892, and in New South Wales, No. 4,028, dated October 8, 1892,) of which the following is a specification.

The object of my invention is to provide a new or improved apparatus whereby carcases of meat can be automatically weighed without being removed from the rail-track upon which they travel.

The apparatus is more particularly adapted for use in freezing works; and it consists of two suspended levers connected one behind the other at right angles or otherwise, the front one having a recessed hanging-bar attached thereto, the bottom part of which has a plate of the same thickness as the rail-track fitting into an opening or gap in said rail-track. The back lever is provided with a pointer, while a curved dial-plate, having two series of figures thereon, is attached to a suitable support immediately behind said pointer. The inner series of figures represent the weight of the carcases when hot, while the outer series represent the weight of said carcases when frozen. The levers are so hung and adjusted that when each carcass in traveling along the rail-track passes over the plate attached to the recessed hanging-bar its hot and frozen weight is indicated on the dial-plate by the pointer.

Figure 1:
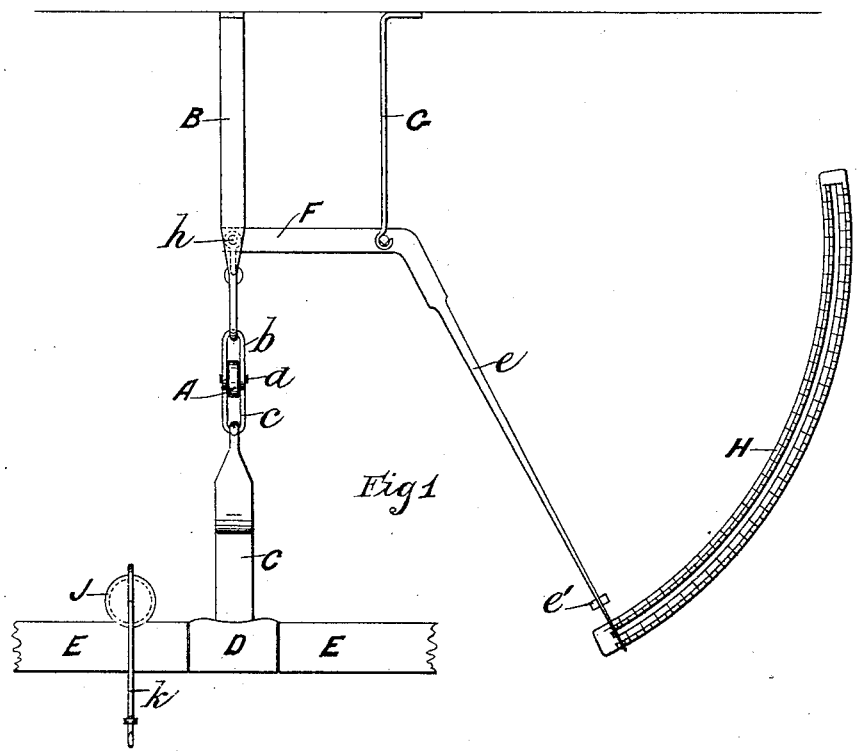
Figure 2:
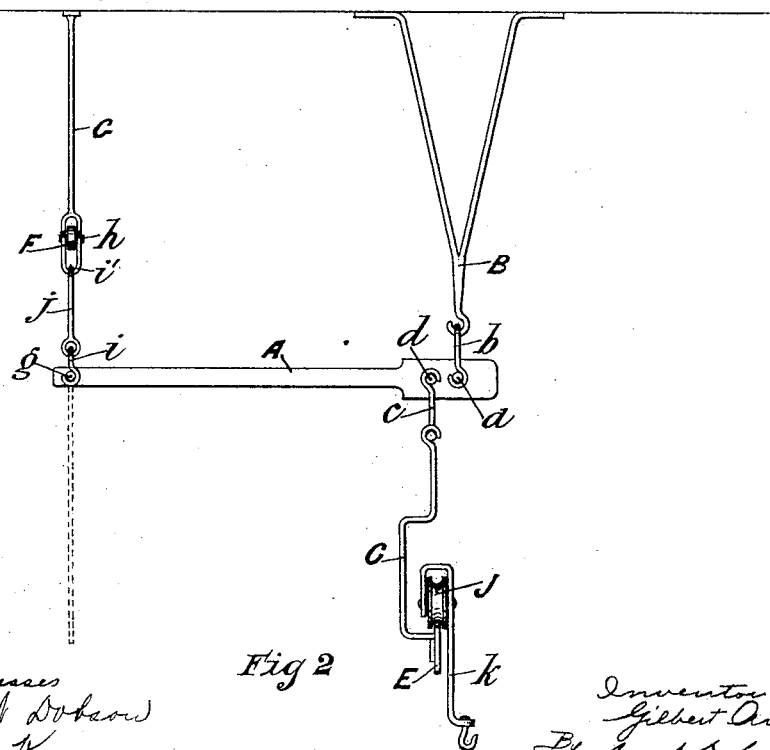

Referring to the drawings, which form a part of this specification, Figures 1 and 2 are respectively a front and end view of the appliance.

Similar letters refer to similar parts in both the figures.

A is the front lever suspended on the fulcrum-pin $a$ to the hanger B by means of the link $b$ or its equivalent. Another link $c$ is hung to a pin $d$, (just behind fulcrum-pin $a$,) and to which the recessed hanging-bar C is suspended. To this hanging-bar a plate D is attached, which is of the same thickness as the rail-track E and fitting to an opening or gap therein.

F is the back lever with pointer $e$, having weight $e'$ suspended on the fulcrum-pin $f$ to the hanger G. The inner end of lever A is suspended on the pin $g$ to the pin $h$ on inner end of lever F by means of the hooks $i$ and $i'$ and link $j$ or their equivalent.

H is the curved dial-plate attached to a suitable support. (Not shown.)

J is the roller or pulley with hook $k$, to which the carcass is hung.

The lever F with pointer $e$ may be placed on either side of lever A and at any desired angle.

It will be readily seen that as the pulley J, together with the hook $k$, having a carcass hung thereto, passes over the plate D the inner ends of the levers A and F are thereby depressed, thus causing the pointer $e$ to swing upward and indicate the weights, hot and frozen, on the dial-plate H. The carcases can thus be passed along the rail very rapidly and each weighed as the pulley passes over the plate D.

I wish it to be understood that I do not confine myself to the precise details in the construction of my apparatus as shown in the annexed drawings, as they may be altered or modified without departing from the nature of my said invention.

Having now described my invention, what I claim as new, and desire to secure by Letters Patent, is—

In track-scales, the combination with the track-rail having the movable section or block D, the lever A disposed horizontally at right angles to said track-rail, the bracket B having the hook, and the link suspended on said hook and pivotally supporting one end of the said lever above the rail, the recessed hanging bar attached at its lower end to the movable section or block, and pivotally suspended at its upper end to the pivoted end of lever A, the lever F working on a pivot, a suspending link and hook connecting the contiguous or corresponding ends of the two levers, and a pointer carried by said lever F and moving over a scale, substantially as described.

In witness whereof I have hereto set my hand to this specification in the presence of two subscribing witnesses.

GILBERT ANDERSON.

Witnesses:
A. H. HART,
HENRY SLATER.